United States Patent Office 3,721,670
Patented Mar. 20, 1973

3,721,670
3-SUBSTITUTED-AS-TRIAZINO[5,6-c]QUINOLINES
George Carlin Wright and Chia Nien Yu, Norwich, N.Y., assignors to Morton-Norwich Products, Inc.
No Drawing. Filed Apr. 5, 1971, Ser. No. 131,482
Int. Cl. C07d 55/08
U.S. Cl. 260—248 AS
6 Claims

ABSTRACT OF THE DISCLOSURE

Novel 3-substituted-as-triazino[5,6-c]quinolines of the formula:

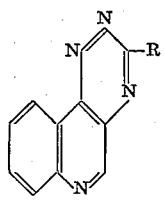

wherein R is chloro, amino, 2-hydroxyethylamino, methoxy, or diallylamino are useful as antifungal agents.

This invention relates to chemical compounds. More particularly this invention is concerned with a series of 3-substituted-as-triazino[5,6-c]quinolines of the formula:

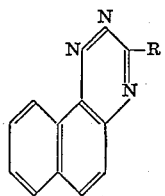

wherein R is chloro, amino, 2-hydroxyethylamino, methoxy, or diallylamino which display a high degree of antifungal activity against numerous fungi and yeasts.

The compounds of this invention are inimical to a variety of organisms such as *Candida albicans, Microsporum canis, Torulopsis glabrata, Candida tropicalis, Candida krusei, Candida quilliermondi* and *Aspergillus niger* which are often times associated with fungal diseases in animals and man. These compounds are useful when incorporated in various dosage forms such as dusts, suspensions, sprays, ointments, pastes and the like as the active ingredient in inhibiting and combating such infection. Concentration of the active ingredient in such dosage forms ranges from one part per 10,000 parts by weight to one part per 100,000 parts.

The compounds of this invention are readily prepared. It is now preferred to prepare the 3-chloro-as-triazino-[5,6-c]quinoline according to the following scheme:

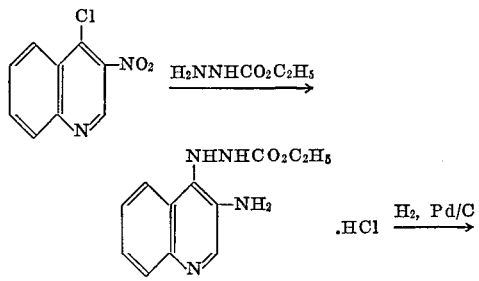

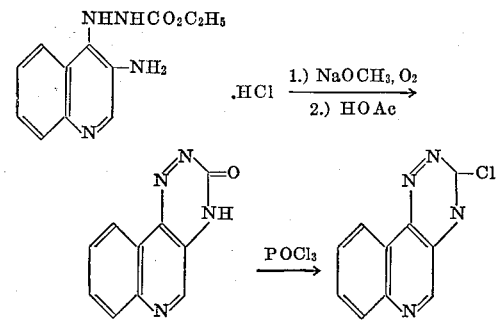

The chloro compound thus obtained is reacted with amines or sodium methoxide to accomplish replacement of the chloro substitutent.

In order that this invention may be readily available to and understood by those skilled in the art the following examples are appended:

EXAMPLE I 3-chloro-as-triazino[5,6-c]quinoline (A) Ethyl 3-(3-nitro-4-quinolyl)carbazate hydrochloride A 210 g. (1.01 mole) portion of 4-chloro-3-nitroquinoline was added to 2 l. of isopropanol; a temperature rise of 10° was noted. The mixture was treated with 105 g. (1.01 mole) of ethyl carbazate at 25–30°, using rapid mechanical stirring and a drying tube. The reaction mixture was heated for 50 min. on a steam bath, cooled 10 min. in an ice bath, and stored in the refrigerator overnight. A light tan solid was collected, washing with seven 20 ml. portions of isopropanol and two 125 ml. portions of dry ether, M.P. 201–203° dec. Yield: 234 g. (75%).

(B) Ethyl 3-(3-amino-4-quinolyl)carbazate hydrochloride

A 73 g. (0.22 mole) portion of ethyl 3-(3-nitro-4-quinolyl)carbazate hydrochloride in 600 ml. of ethanol was treated with 4.8 g. of 5% Pd/C (50% $H_2O$) in 90 ml. of ethanol, and subjected to hydrogenation in a 2 l. bottle at 40 p.s.i.g. Hydrogen uptake was 42 p.s.i.a. at 28° (theory 45 p.s.i.a. at 28°) in 1 hr. The first 40 p.s.i.a. was absorbed in ca. 9 min. The crude reaction mixture was stored in the refrigerator overnight and collected, washing with five 20 ml. portions of ethanol and two 100 ml. portions of dry ether, M.P. 210°. Yield: 53 g.– 2.5 g. catalyst=51 g. (82%).

The product was recrystallized from 1 l. of methanol, storing in the refrigerator overnight, washing the yellow crystalline solid with five 20 ml. portions of methanol and two 100 ml. portions of dry ether, M.P. 241–246° dec. Yield: 34 g. (55%).

(C) As-triazino[5,6-c]quinolin-3-ol sodium salt

A 130 g. (0.46 mole) portion of ethyl 3-(3-amino-4-quinolyl)carbazate hydrochloride in 650 ml. of methanol was treated with 65 g. (1.20 mole) of $NaOCH_3$ in 370 ml. of ethanol at 5–10° in ½ hr., using rapid mechanical stirring (1). The reaction mixture was allowed to warm to room temperature over 1¼ hr., and cooled for ¾ hr. A bright yellow crystalline solid was collected, washing with two 50 ml. portions of methanol, two 100 ml. portions of isopropanol and 300 ml. of dry ether. Yield: 138 g. (2).

(D) As-triazino[5,6-c]quinolin-3 (4H)-one

A 69 g. (0.31 mole) portion of triazino[5,6-c]quinolin-3-ol sodium salt was added portionwise to 276 ml. of glacial acetic acid at 15–20° using rapid mechanical stirring. The reaction mixture was warmed to room temperature over 1¼ hr. and then cooled at 17–19° for 1 hr. An orange solid was collected washing with seven 20 ml. portions of cold isopropanol and four 80 ml. portions of dry ether, M.P. sinter 218–220°, 228–300°+dec. Yield: 50 g. (82%).

The crude product was recrystallized from 1550 ml. of acetic acid, using Darco, and washing with seven 25 ml. portions of cold isopropanol and eight 50 ml. portions of dry ether, M.P. 285–298° dec. Yield: 29 g. (47%).

*Analysis.*—Calcd. for $C_{10}H_6N_5O$ (percent): C, 60.60; H, 3.05; N, 28.27. Found (percent): C, 60.42; H, 3.25; N, 28.46.

(E) 3-chloro-as-triazino[5,6-c]quinoline

A 35 g. (0.18 m.) portion of as-triazino[5,6-c]quinoline-3(4H)-one was added to 150 ml. of $POCl_3$ at 20–25° employing rapid mechanical stirring and a drying tube. The reaction mixture was heated rapidly (10 min.) to 102°–105° for a 7 min. period and cooled rapidly to 2–5°. The cooled reaction mixture was poured with rapid stirring into 1300 g. of ice, allowed to warm to 15° over 1 hour and cooled 1 hour. A brown solid was collected washing with five 80 ml. portions of $H_2O$. The crude product was air dried and finally dried in a vacuum desiccator over Drierite, M.P. 171–181° dec. Yield: 22 g. (56%).

The product was recrystallized from 550 ml. of ethyl acetate, M.P. 173°–174°. Yield: 7 g. (18%).

Concentration of the recrystallization filtrate on the rotovap gave 7.5 g. of a yellow crystalline solid, M.P. 171–173°. The recovered product was recrystallized from 80 ml. of ethyl acetate, M.P. 174–175°. Yield: 3.5 g. (9%).

*Analysis.*—Calcd. for $C_{10}H_5Cl_4N_4$ (percent): C, 55.44; H, 2.33; N, 25.87; Cl, 16.37. Found (percent): C, 55.33; H, 2.60; N, 25.49; Cl, 16.53; 16.51.

EXAMPLE II 3-amino-as-triazino[5,6-c]quinoline

A 10 g. (0.046 mole) portion of 3-chloro-as-triazino-[5,6-c]quinoline in 190 ml. of ethanol was treated with a stream of dry ammonia for 45 min., below 35°, using rapid mechanical stirring. The reaction mixture was cooled in an ice bath for 1 hr. and a bright yellow solid was collected washing with six 10 ml. portions of ethanol and an equal amount of dry ether, M.P. 300° dec. Yield: 8 g. (88%) (1).

*Analysis.*—Calcd. for $C_{10}H_7N_5$ (percent): C, 60.90; H, 3.58; N, 35.52. Found (percent): C, 61.10; H, 4.01; N, 35.35.

EXAMPLE III 3-(2-hydroxyethylamino)-as-triazino[5,6-c]quinoline

A 20.5 g. (0.095 mole) portion of 3-chlorotriazino-[5,6-c]quinoline in 410 ml. of ethanol was treated dropwise with 8.6 g. (0.14 mole) of 2-aminoethanol at 25–27°, using rapid mechanical stirring. The reaction mixture was refluxed for 45 min. and cooled in an ice bath for 1 hr. A bright yellow crystalline solid was collected washing with ethanol and ether, M.P. 216–220°. Yield: 17 g. (74%).

*Analysis.*—Calcd. for $C_{12}H_{11}N_5O$ (percent): C, 59.74; H, 4.60; N, 29.03. Found (percent): C, 59.36; H, 4.39; N, 29.07.

EXAMPLE IV 3-methoxy-as-triazino[5,6-c]quinoline

A mixture of 44 g. (0.2 m.) of 3-chloro-as-triazino-[5,6-c]quinoline, 11 g. (0.2 m.) of sodium methoxide powder in 2 l. of methanol was heated at reflux for 1 hr. and then filtered hot. After cooling, the solid was collected, washed with methanol and air dried to give 31.4 g. of 3-methoxy-as-triazino[5,6-c]quinoline, M.P. 163°–167° with previous softening. Concentration of the filtrate gave a second crop which, after recrystallization from methanol yielded 4.5 g. more of product (85%).

EXAMPLE V 3-diallylamino-as-triazino[5,6-c]quinoline

A mixture of 44 g. (0.2 m.) of 3-chloro-as-triazino-[5,6-c]quinoline, 40 g. (0.4 m.) of diallylamine in 1 l. of ethanol was heated at reflux for 1¼ hr. After slight cooling, water was added to the dark solution to cloud point and it was then cooled overnight. The solid was collected, washed with aqueous ethanol, and air dried to give 41 g. of 3-diallylamino-as-triazino[5,6-c]quinoline, M.P. 68–70°.

What is claimed is:
1. A compound of the formula:

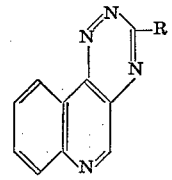

wherein R is chloro, amino, 2-hydroxyethylamino, methoxy or diallylamino.

2. The compound of claim 1 wherein R is chloro.
3. The compound of claim 1 wherein R is amino.
4. The compound of claim 1 wherein R is 2-hydroxyethylamino.
5. The compound of claim 1 wherein R is methoxy.
6. The compound of claim 1 wherein R is diallylamino.

References Cited

UNITED STATES PATENTS 3,255,191  6/1966  Dexter et al. _____ 260—249.5 X
3,480,628  11/1969  Chow et al. _____ 260—249.5

JOHN M. FORD, Primary Examiner

U.S. Cl. X.R.

260—249.5, 287 R; 424—249